United States Patent [19]
Nishida et al.

[11] Patent Number: 5,186,693
[45] Date of Patent: Feb. 16, 1993

[54] AUTOMATIC TRANSMISSION

[75] Inventors: Masaaki Nishida; Naoji Kato, both of Anjo; Yochi Hayakawa, Toyoake, all of Japan

[73] Assignee: Aisin AW Co., Ltd., Japan

[21] Appl. No.: 750,592

[22] Filed: Aug. 28, 1991

[30] Foreign Application Priority Data

Sep. 25, 1990 [JP] Japan .................................. 2-251987

[51] Int. Cl.⁵ ............................................. F16H 3/62
[52] U.S. Cl. .................................. 475/148; 475/146; 192/85 AA; 192/48.92
[58] Field of Search ................... 192/48.8, 48.9, 48.91, 192/48.92, 85 AA; 475/148, 146

[56] References Cited

U.S. PATENT DOCUMENTS

| | | | |
|---|---|---|---|
| 3,747,730 | 7/1973 | Hause | 475/146 X |
| 4,237,749 | 12/1980 | Koivunen | 475/148 X |
| 4,747,323 | 5/1988 | Kinichi et al. | 475/146 X |
| 4,836,052 | 6/1989 | Iwanaga et al. | 475/148 |
| 4,971,185 | 11/1990 | Hayakawa et al. | 192/85 AA |

Primary Examiner—Dirk Wright
Attorney, Agent, or Firm—Lorusso & Loud

[57] ABSTRACT

An automatic transmission includes: a connection member including an outer cylinder and an inner cylinder and defining a first annular space; a first annular piston arranged in the first annular space and defining a second annular space together with the inner cylinder; a second annular piston arranged in the second annular space; a spring retainer mounted on the inner cylinder in opposition to the second annular piston; a spring interposed between the spring retainer and the second annular piston; a first clutch adapted to come into and out of engagement with a sun gear by the actuation of the first annular piston 72; a second clutch adapted to come into and out of engagement with an input shaft by the actuation of the second annular piston and left disengaged during forward running; a one-way clutch arranged adjacent to the first clutch and adapted to come into and out of engagement with the sun gear; and a brake interposed between the outer cylinder and the transmission casing. The one-way clutch has its outer race fixed to a flange, which is splined to the outer cylinder, and its inner race fixed to the flange of the first clutch and splined to the sun gear.

20 Claims, 4 Drawing Sheets

FIG. I

|       | C0 | C1 | C2 | C3  | C4  | B1 | B2  | F0 | F1 | F2 |
|-------|----|----|----|-----|-----|----|-----|----|----|----|
| 1 ST  |    | ○  |    | (○) |     |    | (○) | ○  |    | ○  |
| 2 ND  |    | ○  |    | (○) | (○) | ○  |     | ○  | ○  |    |
| 3 RD  | ○  | ○  |    | ○   |     | ○  |     | ○  |    |    |
| 4 TH  | ○  | ○  |    |     | ○   | ○  |     |    |    |    |
| REV.  |    |    | ○  |     | ○   |    | ○   |    | ○  |    |

FIG. 3

AUTOMATIC TRANSMISSION

BACKGROUND OF THE INVENTION

1. Field of the Invention

The present invention relates to an automatic transmission for an automobile.

2. Description of the Prior Art

In the prior art, the automotive automatic transmission is equipped with a plurality of planetary gear sets and frictional engagement elements such as brakes or clutches connected with the individual components of the planetary gear sets. Thus, the automatic transmission realizes each of gear stages by engaging the individual frictional engagement elements selectively.

Moreover, the four-speed shift gear mechanism of plural a forward four-speed automatic transmission is equipped with a planetary gear unit which is formed by coupling a single planetary gear and a dual planetary gear. The two planetary gears of the planetary gear set have their sun gears integrated and their pinions sharing the carriers. The carriers supporting the aforementioned pinions and the pinion meshing with the ring gear of the dual planetary gear are also integrated.

Moreover, the input shaft extending from the output member of the torque converter is connected through a first clutch C1 to a connection member and through a second clutch C2 to a sun gear. A third clutch C3 and a one-way clutch F0 are interposed between the connection member and the ring gear of the single planetary gear, and a fourth clutch C0 is interposed between the aforementioned connection member and a larger ring gear.

On the other hand, the aforementioned sun gear can be retained by a first brake B1 which is a band brake, and a second brake B2 and a one-way clutch F1 are interposed between the larger ring gear and casing. Moreover, the carrier is connected to an output gear which is positioned generally at the central portion of the shift gear mechanism.

In the automatic transmission thus constructed: at a 1st speed, the first clutch C1 is engaged; at a 2nd speed, the first brake B1 is engaged in addition to the first clutch C1; at a 3rd speed, the first brake B1 is released, but the third clutch C3 and the fourth clutch C0 are engaged; and at a 4th speed, the third clutch C3 is released, but the first brake B1 is engaged.

At the 1st speed, moreover, the one-way clutch F1 and the one-way clutch F0 are engaged. At a shift from the 1st to 2nd speeds, however, the one-way clutch F1 runs over to prevent the shocks which might otherwise be caused by the change in the engagement.

At a shift from the 2nd to 3rd speeds, on the other hand, the shocks due to the engagement change are prevented by adjusting both the timing of feeding oil to the brake releasing hydraulic chamber of a hydraulic servo for engaging and releasing the first brake B1 and the timing of feeding the oil to a hydraulic servo for engaging and releasing the fourth clutch C0.

At a shift from the 3rd to 4th speeds, moreover, the 3rd speed state is maintained by the second one-way clutch F0 when the third clutch C3 is released, and the retention of the first brake B1 is delayed by the hydraulic control to prevent the shocks due to the engagement change.

In the automatic transmission thus constructed, however, at the shift from the 2nd to 3rd speeds, the shocks due to the engagement change are prevented by adjusting both the timing of feeding oil to the brake releasing hydraulic chamber of the hydraulic servo for engaging and releasing the first brake B1 and the timing of feeding the oil to the hydraulic servo for engaging and releasing the fourth clutch C0. As a result, the hydraulic control system is complicated, and still worse it is difficult to achieve the optimum shift feel for all running conditions and all vehicles.

At the shift from the 3rd to 4th speeds, moreover, the first brake B1, which has been released at the shift from the 2nd to 3rd speeds, has to be engaged again. By thus repeating the engagement and release, the band composing the first brake (or band brake) B1 is subjected to changing stress which decreases its durability.

Especially the 3rd and 4th speeds are very frequently used, and the aforementioned first brake B1 is repeatedly engaged and released at the shifts inbetween so that its durability compromised.

Thus, there has been provided (as disclosed in U.S. Pat. No. 4,086,827) an automatic transmission, to which is added a one-way clutch for eliminating the engagement and release of the brake at the shift from the 2nd to 3rd speeds and for preventing the reverse rotation of the sun gear and accordingly the shift shocks.

Incidentally, in the automatic transmission of this kind, a new brake has to be interposed between the aforementioned one-way clutch and the casing so that the axial and radial dimensions are enlarged.

SUMMARY OF THE INVENTION

The present invention has an object to solve the aforementioned problems of the automatic transmission of the prior art and to provide an automatic transmission which is enabled by a simple structure to prevent the shocks due to the change in the engagement between the brake and the clutch at the time of each shift of gear stages and to improve the durability of the band brake without enlarging the axial and radial dimensions.

According to the present invention, therefore, there is provided an automatic transmission which comprises: a connection member including an outer cylinder and an inner cylinder defining a first annular space; a first annular piston arranged in the first annular space and defining a second annular space together with the inner cylinder; and a second annular piston arranged in the second annular space.

The automatic transmission further comprises: a spring retainer mounted on in the inner cylinder opposing the second annular piston; and a spring interposed, between the spring retainer and the second annular piston.

The automatic transmission further comprises: a first one-way clutch adapted to come into and out of engagement with a sun gear by the actuation of the first annular piston; a second clutch adapted to come into and out of engagement with an input shaft by the actuation of the second annular piston and left disengaged during forward running; a one-way clutch arranged adjacent to the first clutch and adapted to come into and out of engagement with the sun gear; and a brake interposed between the outer cylinder and a casing.

The one-way clutch has its outer race fixed to a flange, which is splined to the outer cylinder, and its inner race fixed to the flange of the first clutch and splined to the sun gear.

As a result, the first annular piston acts as the cylinder of the second annular piston, and the single spring acts on both the first and second annular pistons so that the axial size can be reduced.

As a result, the aforementioned one-way clutch can have its concentricity retained so that the size of the automatic transmission can be reduced by making use of the axially short one-way clutch.

Moreover, the brake can have the frequency of its engagement and release reduced to improve its durability by engaging the brake at all times at the 2nd speed or higher, by using the one-way clutch for preventing the shift shocks at the shift from the 2nd to 3rd speeds, and by engaging the first clutch at the 4th speed.

BRIEF DESCRIPTION OF THE DRAWINGS

FIG. 3 is a chart enumerating the operations of the automatic transmission of the present invention.

DESCRIPTION OF THE PREFERRED EMBODIMENT

The present invention will be described in detail in the following in connection with the embodiment thereof with reference to the accompanying drawings.

Figure 1:
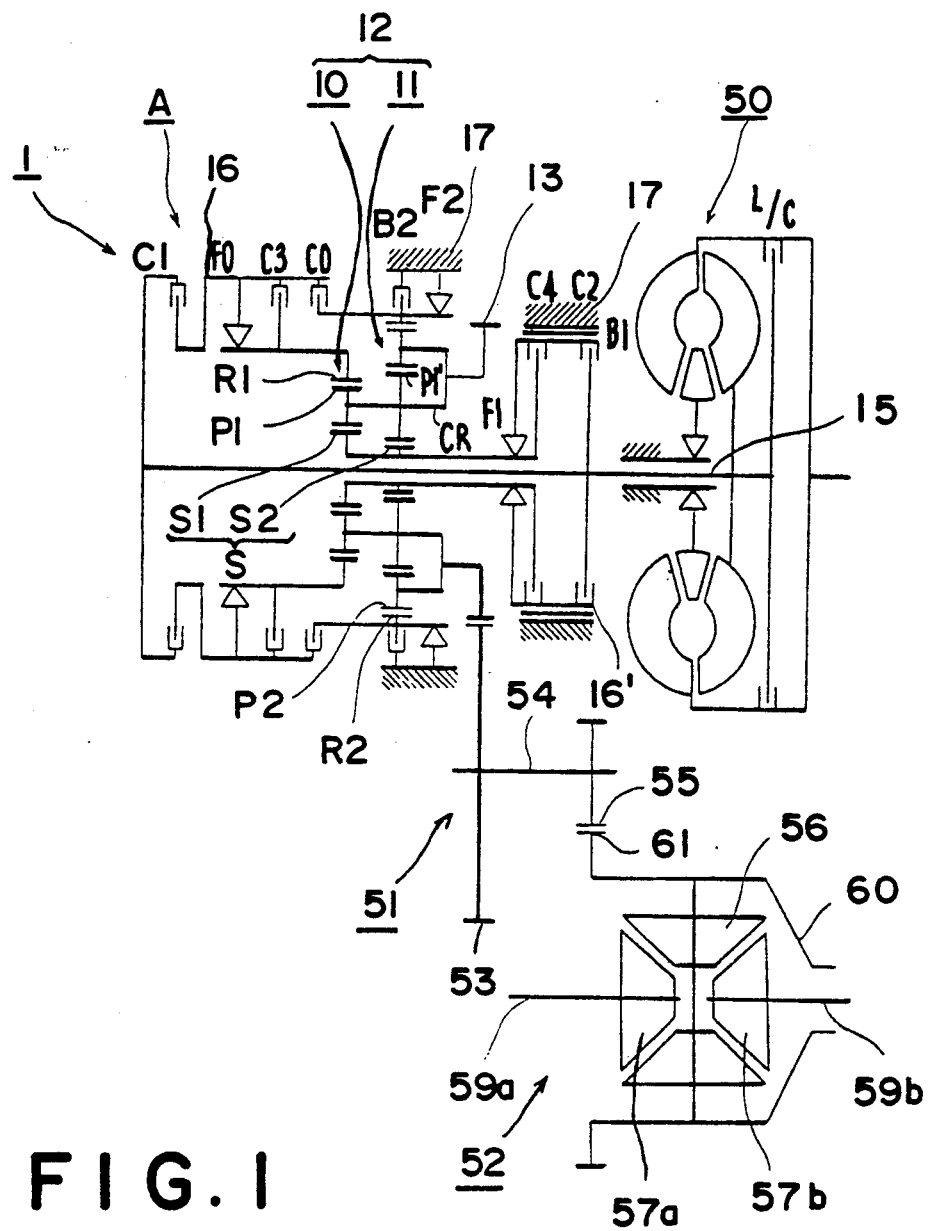
FIG. 1 is a skeletal diagram showing the automatic transmission of the present invention.
Figure 2:
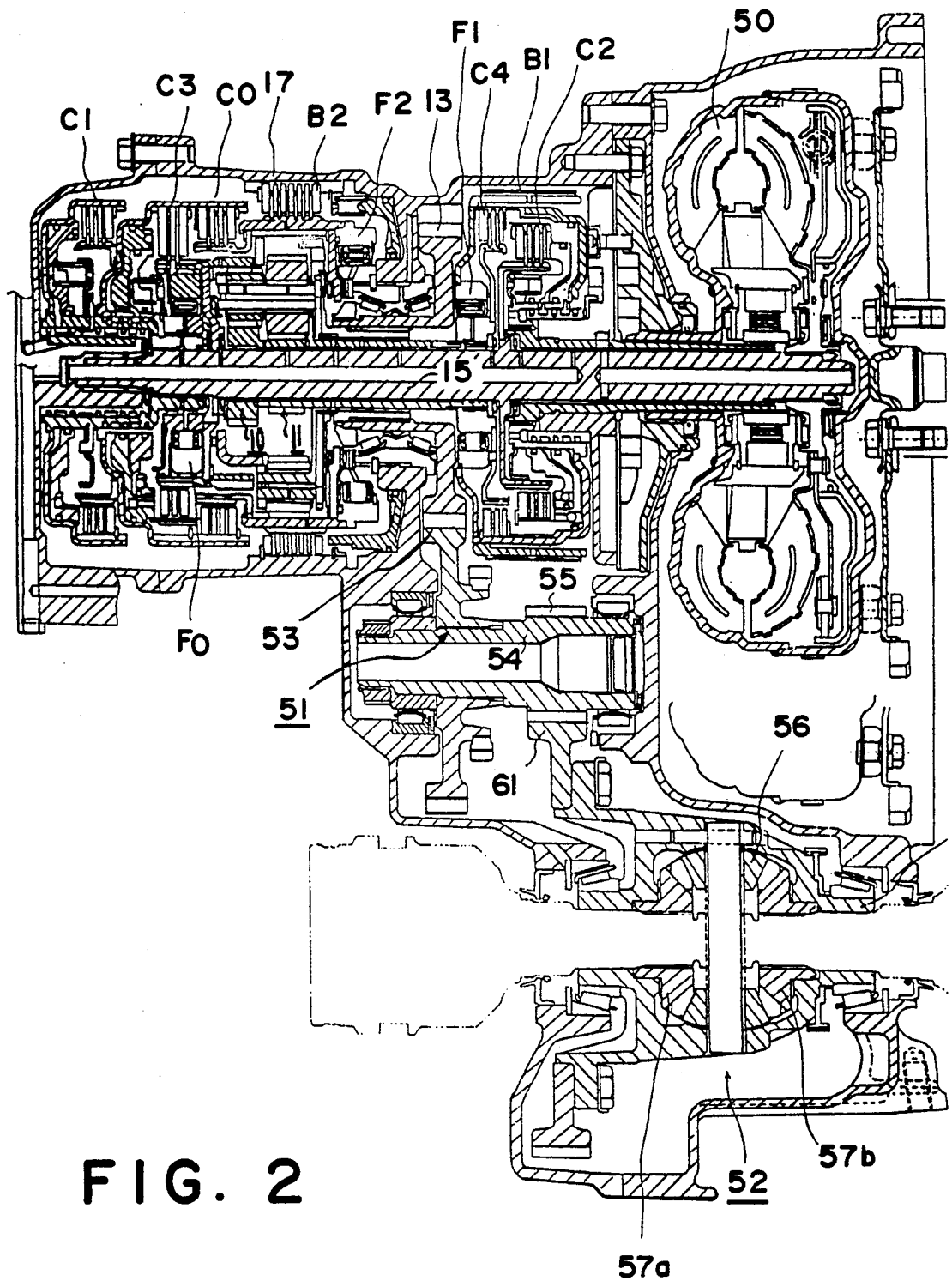
FIG. 2 is a section showing the automatic transmission of the present invention.

FIG. 1 is a skeletal diagram showing an automatic transmission according to the present invention, and FIG. 2 is a section showing the automatic transmission of the present invention.

A four-speed automatic transmission A according to the present invention is constructed of a torque converter 50 having a lockup clutch L/C, a four-speed shift gear mechanism 1, a reduction gear mechanism and a differential gear mechanism 52.

The four-speed shift gear mechanism 1 includes a planetary gear unit 12 having a single planetary gear 10 and a dual planetary gear 11 coupled to each other. The single planetary gear 10 and the dual planetary gear 11 have their respective sun gears S1 and S2 integrated to constitute a sun gear S. Moreover, pinions P1 and P1' meshing with those sun gears S1 and S2 share a carrier CR, which in turn supports the pinion P1' and a pinion P2 meshing with a ring gear (which will be called the "larger ring gear") R2 of the dual planetary gear 11.

On the other hand, an input shaft 15 extending from the output member of the torque converter 50 is connected through a first clutch C1 to a first connection member 16 and through a second clutch C2 to a second connection member 16'.

Moreover, a third clutch C3 and a third one-way clutch F0 are interposed between the first connection member 16 and a ring gear (R1(which will be called the "smaller ring gear") of the single planetary gear 10, and a fourth clutch C0 is interposed between the connection member 16 and the larger ring gear R2.

On the other hand, a fifth clutch C4 and a first one-way clutch F1 are interposed between the aforementioned sun gear S and the second connection member 16', which can be retained by a first brake B1 which is a band brake.

Moreover, a second brake B2 and a second one-way clutch F2 are interposed between the larger ring gear R2 and a casing 17. Still moreover, the carrier CR is connected to an output gear 13 which is positioned generally at the central portion of the shift gear mechanism 1.

On the other hand, the reduction gear mechanism 51 has a counter shaft 54 which is supported rotatably by the casing 17 and to which are fixed a larger gear 53 and a smaller gear 55 meshing with the aforementioned output gear 13 at all times. On the other hand, the differential gear mechanism 52 is composed of differential pinions 56 and righthand and lefthand side pinions 57a and 57b, which mesh with each other. The side pinions 57a and 57b are fixed to righthand and lefthand front axles 59a and 59b, respectively. On the other hand, the differential pinions 56 are supported by a differential casing 60 which in turn is rotatably supported by the casing 17. In the differential casing 60, there is mounted a ring gear 61 meshing with the aforementioned smaller gear 55 at all times.

Next, the operations of the automatic transmission of the present invention will be described in the following with additional reference to FIG. 3.

Figure 3:
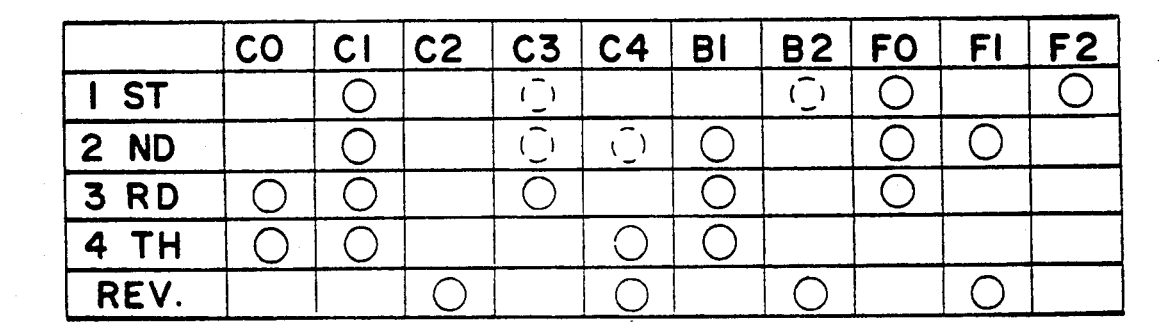

FIG. 3 is a chart enumerating the operations of the automatic transmission of the present invention.

At the 1st speed in forward running, the first clutch C1 is engaged, and the second and third one-way clutches F2 and F0 are engaged. As a result, the input shaft 15 has its rotation transmitted through the first clutch C1 and the third one-way clutch F0 to the smaller ring gear R1. Since, in this state, the larger ring gear R2 has its rotation blocked by the second one-way clutch F2, the carrier CR is drastically decelerated, while the sun gear S is idly rotated, so that the decelerated rotation is output from the output gear 13. Moreover, this output gear 13 has its rotation decelerated by the reduction gear mechanism 51 until it is transmitted to the righthand and lefthand a front axles 59a and 59b by the differential gear mechanism 52.

In the 2nd speed state, moreover, the first brake B1 is engaged in addition to the first clutch C1 so that the idle sun gear S is stopped by the first one-way clutch F1. Since the third one-way clutch F0 is engaged, the input shaft 15 has its rotation transmitted through the first clutch C1 and the third one-way clutch F0 to the smaller ring gear R1. Since the sun gear S is stopped by the first brake B1 and the first one-way clutch F1, the rotation of the smaller ring gear R1 is extracted as the 2nd speed rotation from the carrier CR while turning the larger ring gear R2 idly.

Incidentally, at the shift from the 1st to 2nd speeds, the second one-way clutch F2 runs over to prevent the shift shocks which might otherwise be caused by the change in engagement.

At a 3rd speed state, moreover, the fourth clutch C0 is engaged in addition to the first clutch C1 and the first brake B1. As a result, the rotation of the input shaft 15 is transmitted through the third one-way clutch F0 to the smaller ring gear R1 and through the fourth clutch C0 to the larger ring gear R2 so that the planetary gear unit 12 comes into a direct connected state. Then, the integral rotation thus obtained is extracted from the carrier CR to the output gear 13. At coasting, on the other hand, the third clutch C3 is engaged to prevent the overrun of the third one-way clutch F0.

At this time, the aforementioned integral rotation is transmitted to the sum gear S so that the first one-way clutch F1 runs over to prevent the shift shocks due to the engagement change.

Next, in a 4th speed state, the fifth clutch C4 is switched to the engaged state in addition to the first clutch C1, the fourth clutch C0 and the first brake B1, to stop the rotation of the sun gear S. On the other hand, the third clutch C3 is released prior to the engagement of the fifth clutch C4.

At this time, the rotation of the input shaft 15 is transmitted through the fourth clutch C0 to the larger ring gear R2. Since the sun gear S is retained by the fifth clutch C4, the rotating larger ring gear R2 rotates the carrier CR at a high speed, while rotating the ring gear R1 idly, so that the rotation of the carrier CR is transmitted to the output gear 13.

Incidentally, at the shift from the 3rd to 4th speeds, the third one-way clutch F0 runs over to prevent the shift shocks due to the engagement change.

In case of a downshift from the 4th to 3rd speeds, on the other hand, the fifth clutch C4 is released to cause the planetary gear unit 12 to accomplish an integral rotation, which is extracted from the carrier CR to the output gear 13. Since, at this time, the third one-way clutch F0 can be switched from overrun to retention to prevent the shift shocks.

In case of a downshift from the 3rd to 2nd speeds, on the hand, the fourth clutch C0 is released to relieve the planetary gear unit 12 from its locked state. At this time, the first one-way clutch F1 is switched from the overrun to the retained state to stop the sun gear S so that the -2nd speed is extracted from the output gear 13.

In case of a downshift from the 2nd to 1st speeds, moreover, the first brake B1 is released to effect an idle rotation of the sun gear S and to engage the second one-way clutch F2.

In case of a kickdown from the 4th to 2nd speeds, moreover, the fourth clutch C0 is released to switch the third one-way clutch F0 from the overrun to the retained state so that the rotation of the input shaft 15 is transmitted to the smaller ring gear R1. At this time, the fifth clutch C4 is also released, but the first brake B1 is engaged. As a result, the first one-way clutch F1 is retained to stop the sun gear S so that the 2nd speed is extracted from the output gear 13.

Next, when engine braking in the 1st speed, the second one-way clutch F2 and the third one-way clutch F0 run over to allow coasting so that the second brake B2 and the third clutch C3 are retained. Likewise, when engine braking in the 2nd speed, the first one-way clutch F1 and the third one-way clutch F0 run over to retain the fifth clutch C4 and the third clutch C3.

In the R range, on the other hand, the second clutch C2, the fifth clutch C4 and the second brake B2 are engaged to transmit the rotation of the input shaft 15 through the second clutch C2 and the fifth clutch C4 to the sun gear S. Since, moreover, the larger ring gear R2 is stopped by the second brake B2, the rotation of the aforementioned sun gear S is reversed and transmitted to the carrier CR, while rotating the smaller ring gear R1 idly in the opposite direction, so that the reversed rotation is extracted from the output gear 13.

At this time, moreover, the first one-way clutch F1 is engaged to prevent the shift shocks.

In the automatic transmission thus constructed, the fourth clutch C0 and the third clutch C3 are adjacent to each other, and their inner cylinders, springs and spring retainers are shared inbetween to shorten the axial dimension.

Moreover, the second clutch C2 and the fifth clutch C4 are also adjacent to each other, and their inner cylinders, springs and spring retainers are shared inbetween to shorten the axial dimension.

The arrangement of the second clutch C2 and the fifth clutch C4 will be described in the following.

Figure 4:
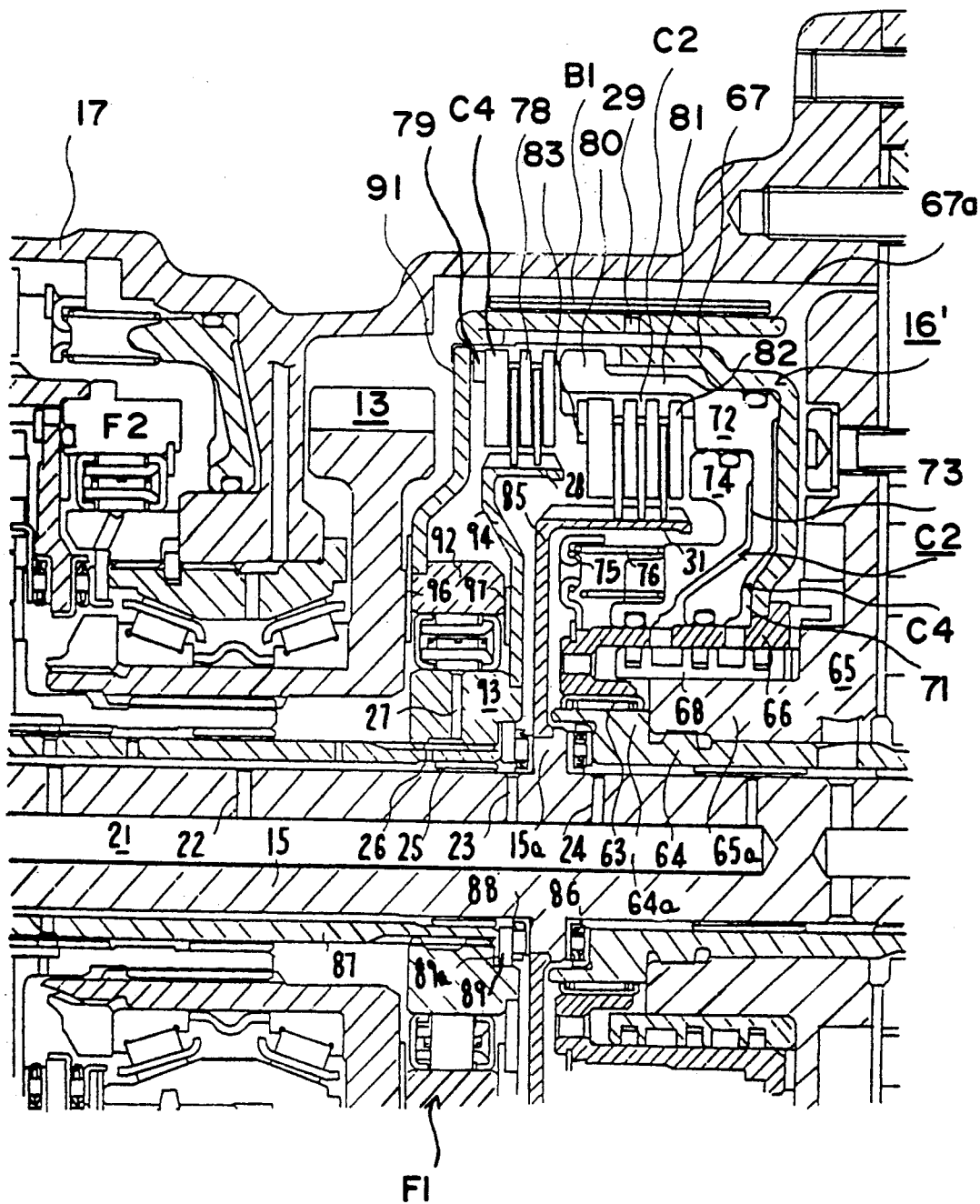
FIG. 4 is a section showing an essential portion of the automatic transmission of the present invention.

FIG. 4 is a section showing an essential portion of the automatic transmission of the present invention.

In FIG. 4, the numeral 16' designates the drum-shaped second connection member which is arranged adjacent to an oil pump cover 65. The aforementioned second clutch C2 and fifth clutch C4 are arranged in the second connection member 16' adjacent to each other.

Moreover, the second connection member 16' is composed of an inner cylinder 66 and an outer cylinder 67 fixed on the inner cylinder 66. This inner cylinder 66 is arranged slidably on the outer circumference of a sleeve 68 which is fixed to the aforementioned oil pump cover 65. Within the interior of the inner cylinder 66, there is arranged a large diameter portion 64a of a stator shaft 64, which is splined to the inner cylindrical surface of a hub 65a of the oil pump cover 65, and is rotatably supported by a bearing 63. The stator shaft 64 is connected to the inner race of the one-way clutch in the torque converter 50 (as better seen from FIG. 2).

Incidentally, the inner cylinder 66 and the sleeve 68 are made of steel to improve the wear resistance when rotated relative to each other, and the oil pump cover 65 is made of aluminum. Moreover, the inner cylinder 66 includes outer cylindrical portion having a large axial length. This outer cylindrical portion has its outer surface in frictionally sliding engagement with first and second annular pistons 72 and 74 and its inner face in frictionally sliding engagement with the sleeve 68. The inner cylinder 66 further includes an inner cylindrical portion having a relatively shorter axial length and its inner surface sliding on the stator shaft 64 through the bearing 63. These members are machined to improve the centricity with the first and second annular pistons 72 and 74.

The outer cylinder 67 has an outer surface defined by a folded or turned edge 67a, which receives the band of the aforementioned first brake B1 to form a frictional interface. This outer cylinder 67 is formed by press molding.

A first annular cylinder chamber 71 formed in the aforementioned second connection member 16' contains the first annular piston 72 which is slidable therein to form a hydraulic servo $C_4$ for the fifth clutch C4.

The first annular piston 72 has a dish-shaped section forming a second annular cylinder chamber 73 together with the inner cylinder 66. Moreover, the second annular piston 74 is slidably arranged in the second annular cylinder chamber 73 to form a hydraulic servo $C_2$ for the second clutch C2.

Through the aforementioned sleeve 68, the oil is pumped to and from the respective hydraulic servos $C_2$ and $C_4$ of the second and fifth clutches C2 and C4.

The inner cylinder 66, supports a spring retainer 75 which is opposed to the second annular piston 74. A spring 76 is arranged between the spring retainer 75 and the second annular piston 74.

To the aforementioned outer cylinder 67, on the other hand, there is splined a thin plate 78 for the fifth clutch C4, which is restricted in its axial movement by a snap ring 79. Moreover, an abutment portion 80 of the first annular piston 72 is opposed to the thin plate 78 for the fifth clutch C4. The abutment portion 80 is splined to the outer cylinder 67 so that it is allowed to move only in the axial direction.

When, the hydraulic servo $C_4$ for the fifth clutch C4 is fed with the oil, the first annular piston 72 is axially moved to engage and release the thin plate 78 for the fifth clutch C4.

On the inner surface of a cylinder portion 81 of the first annular piston 72, there is splined a thin plate 82 for the second clutch C2, which is restricted in its axial movement by a snap ring 83. The second annular piston 74 is arranged to abut against the thin plate 82 for the second clutch C2.

When, the hydraulic servo C2 for the second clutch C2 is fed with the oil, the second annular piston 74 is axially moved to engage and release the thin plate 82 for the second clutch C2.

Here, the second clutch C2 and the fifth clutch C4 can operate independently of each other. Moreover, the second clutch C2 is engaged only for the reverse, and the fifth clutch C4 is simultaneously engaged.

The second clutch C2 has its clutch flange 85 fixed on an enlarged portion 15a of the aforementioned input shaft 15 so that the rotation of the input shaft 15 is transmitted through the first annular piston 72 to the outer cylinder 67 when the second clutch C2 is engaged.

The enlarged portion 15a has a first end face abutting the enlarged portion 64a of the stator shaft 64 through a thrust bearing 86. The enlarged portion 15a has an opposite face abutting sun gear shaft 87 through a thrust bearing 88. Incidentally, reference numeral 89 designates a race of the thrust bearing 88.

To the inner surface of the end portion of the outer cylinder 67 of the second connection member 16' is splined a plate-shaped flange 91 which extends radially inward. This flange 91 is fixed to an outer race 92 of the first one-way clutch F1. As a result, the first one-way clutch F1 and the second connection member 16' are connected. On the other hand, the first one-way clutch F1 has its inner race 93 splined to the aforementioned sun gear shaft 87 to connect the second connection member 16' and the sun gear S.

Incidentally, the thin plate 78 of the fifth clutch C4 is arranged at its inner circumference with a clutch flange 94 which is fixed to the inner race 93 of the first one-way clutch F1. As a result, the second connection member 16' is connected to the sun gear S by engaging the fifth clutch C4.

The first one-way clutch F1 has its outer race 92 arranged between washers 96 and 97 to allow relative rotation between the outer race 92 and the output gear 13 and between the outer race 92 and the clutch flange 94.

The outer race 92 abuts against the output gear 13 through the washer 96. Therefore, the inner race 93 can be axially moved to ensure the concentricity between the outer race 92 and the inner race 93 and to prevent the rolling-out and rolling-in phenomena of the splines during free rotation.

The inner race 93 is provided at its inner circumference with a notch 89a, which establishes a gap between itself and the race 89 of the aforementioned thrust bearing 88. As has been described hereinbefore, the inner race 93 is splined to the sun gear shaft 87 to allow the axial movements.

Thanks to the gap thus formed, no axial thrust load is borne when the sun gear shaft 87 integrated with the sun gear S is axially moved.

The aforementioned input shaft 15 is formed with an axially extending oil passage 21 for feeding the lubricating oil, from which are radially extended oil passages 22, 23 and 24. Thus, the lubricating oil from the oil passage 22 is fed to the oil passage between the input shaft 15 and the sun gear 87. Between the sun gear shaft 87 and the input shaft 15, there is interposed a bushing 25 which rotatably supports the sun gear shaft 87. This bushing 25 is lubricated with the lubricating oil which is fed from the oil passage 22.

The portion of the sun gear shaft 87 facing the first one-way clutch F1 is formed with an oil passage 26, through which the splined connection between the sun gear shaft 87 and the inner race 93 is lubricated.

The inner race 93 is formed with a radially extending oil passage 27, through which the lubricating oil is fed to lubricate the spring.

The lubricating oil is fed radially outward from the oil passage 23 to lubricate the thrust bearing 88 and is fed through the gap between the clutch flanges 85 and 94 to an oil sump which is formed in the interior of the clutch hub 28. The lubricating oil is further fed through a not-shown oil passage, which is formed in the clutch hub 28, to cool down the thin plate 78 for the fifth clutch C4. After this, the lubricating oil is fed to the inner surface of the turned edge 67a of the second connection member 16' to cool down the frictional face of the first brake B1 through an oil passage 29 which is formed in the edge fold 67a.

The lubricating oil fed radially through the aforementioned oil passage 24 is fed through the oil passage between the input shaft 15 and the stator shaft 64 to cool down the thrust bearing 86. After this, the lubricating oil is fed along the clutch flange 85 to an oil sump, which is formed in the interior of a clutch hub 31, and is further fed through a not-shown oil passage formed in the clutch hub 31, to cool down the thin plate 82 for the second clutch C2. The lubricating oil having cooled down the thin plate 82 for the second clutch C2 is fed to the inner circumference of the turned edge 67a of the second connection member 16' to cool down the frictional interface of the first brake B1 through the oil groove 29 which is formed in said turned edge 67a.

Incidentally, the present invention should not be limited to the embodiment thus far described but can be modified in various manners without departure from the gist thereof, and these modifications should not be excluded from the scope of the present invention.

What is claimed is:

1. An automatic transmission comprising:
   a casing;
   input and output members;
   a planetary gear set connecting said input member with said output member and having elements including a sun gear, a carrier and a ring gear;
   a connecting member having an inner cylinder slidably mounted within said casing and a first outer cylinder;
   a first annular piston slidably mounted between said inner and said first outer cylinder to define a first chamber;
   a first clutch for connecting and disconnecting said connecting member to and from one of said elements of said planetary gear set;
   a brake provided between said connecting member and said casing; and
   a one-way clutch provided between said one element of said planetary gear set and said first clutch, said one-way clutch including inner and outer races, one of said races being connected to said connecting member and the other of said races being connected to said first clutch.

2. An automatic transmission according to claim 1, wherein said automatic transmission has three speed stages including:
   a first stage at which said one element is connected to said casing via said one-way clutch and said brake;
   a second stage at which said one element is rotated and the outer race is connected to the casing via said brake; and
   a third stage at which said one element is connected to the casing via said first clutch and said brake.

3. An automatic transmission according to claim 2, wherein said first stage is a low speed stage, said second stage is a middle speed stage, and said third stage is a high speed stage during forward running.

4. An automatic transmission according to claim 1, wherein said inner race is connected to said first clutch, and said outer race is connected to said connecting member.

5. An automatic transmission according to claim 4, wherein said first clutch comprises a radially inward extending clutch flange fixed to said inner race, at least one clutch plate and at least one clutch disc respectively splined to first connecting member and said clutch flange.

6. An automatic transmission according to claim 5, wherein said inner race is splined to said one element and said outer race is splined to said connecting member.

7. An automatic transmission according to claim 4, wherein said first annular piston has a hollow interior and a wall defining a second outer cylinder and further comprising:
   a second annular piston slidably mounted between said second outer cylinder and said inner cylinder, thereby defining a second chamber in conjunction with said first annular piston; and
   a second clutch for connecting and disconnecting said second outer cylinder to and from said input member to provide a reverse drive stage in which said one element is connected to said input member via said first and second clutches.

8. An automatic transmission according to claim 5, wherein said first annular piston has a hollow interior and a wall defining a second outer cylinder and further comprising:
   a second annular piston slidably mounted between said second outer cylinder and said inner cylinder, thereby defining a second chamber in conjunction with said first annular piston; and
   a second clutch for connecting and disconnecting said second outer cylinder to and from said input member to provide a reverse drive stage in which said one element is connected to said input member via said first and second clutches.

9. An automatic transmission according to claim 7 wherein said second clutch is located within said hollow interior and comprises a plurality of clutch plates interleaved with a plurality of clutch discs, said clutch plates being splined to said second outer cylinder.

10. An automatic transmission according to claim 9, wherein said second clutch further comprises a second clutch flange splined to said clutch discs and fixed to said input member.

11. An automatic transmission according to claim 8 wherein said second clutch is located within said hollow interior and comprises a plurality of clutch plates interleaved with a plurality of clutch discs, said clutch plates being splined to said second outer cylinder.

12. An automatic transmission according to claim 11, wherein said second clutch further comprises a second clutch flange splined to said clutch discs and fixed to said input member.

13. An automatic transmission according to claim 1, wherein said one element is said sun gear.

14. An automatic transmission according to claim 2, wherein said one element is said sun gear.

15. An automatic transmission according to claim 4, wherein said one element is said sun gear.

16. An automatic transmission according to claim 6, wherein said one element is said sun gear.

17. An automatic transmission according to claim 1, wherein said one race is fixed to a radially extending flange, said radially extending flange being splined to said connecting member and wherein said outer race is fixed to a first clutch flange, said first clutch flange being splined to said first clutch.

18. An automatic transmission according to claim 17, wherein said one element is said sun gear.

19. An automatic transmission according to claim 10, wherein said one element is said sun gear.

20. An automatic transmission according to claim 12, wherein said one element is said sun gear.

* * * * *